United States Patent Office 3,563,927
Patented Feb. 16, 1971

3,563,927
AMINOAMIDES AND CURING OF EPOXY RESINS
Rainer Janssen, Kamen, Manfred Drawert, Werne an der Lippe, and Eugen Griebsch, Unna, Germany, assignors to General Mills, Inc., a corporation of Delaware
No Drawing. Filed Jan. 30, 1968, Ser. No. 701,542
Claims priority, application Germany, Feb. 15, 1967, Sch 40,235
Int. Cl. C08g 20/26, 30/14
U.S. Cl. 260—18     5 Claims

ABSTRACT OF THE DISCLOSURE

There is disclosed the preparation of aminoamides of polymeric fat acids and an excess of certain ether diamines and the curing of epoxy resins therewith the ether diamine is of the formula:

$$H_2N-R-O(CH_2)_n-O-R-NH_2$$

where R is $-CH_2-CH_2-$, $CH_2-CH_2-CH_2$, or $$-CH_2-CH-CH_2-$$
$$\qquad\quad |$$
$$\qquad\quad CH_3$$

and $n$ is 3, 4, 5, or 6.
The aminoamides, particularly in combination with epoxy resins, find utility as coating compositions, sealing compounds, troweling compounds, adhesives and laminates.

---

This invention relates to aminoamides prepared by condensation of polymeric fatty acids or their amide-forming derivatives with an excess of ether diamines according to the known methods, characterized thereby that the ether diamines are amines of the general formula $$H_2N-R-O-(CH_2)_n-O-R-NH_2$$

where R is $-CH_2-CH_2-$, $-CH_2-CH_2-CH_2-$, or $$-CH_2-CH-CH_2-$$
$$\qquad\quad |$$
$$\qquad\quad CH_3$$

residue and $n$ is 3,4,5, or 6. The invention also relates to the curing of epoxy resins with said aminoamides.

The aminoamides of the invention are fluid and clear products at room temperatures, and exhibit good compatibility with epoxy resins. Polymeric fatty acids suitable for the process of the invention can be obtained through homo- or copolymerization of unsaturated fatty acids having one or several double bonds. The homopolymerization can be carried out thermally, preferably in the presence of catalysts. The homopolymeric fatty acids obtained in this manner, in addition to trimeric and monomeric fatty acid fractions, contain predominantly dimeric fatty acids. Preparation of polymeric fatty acids by copolymerization can be carried out by various methods, particularly by using catalysts. The preferred material for this procedure are conjugated unsaturated fatty acids or their esters, with styrene and vinyl toluene as copolymerizable compounds. The resulting crude polymerization product generally consists of mixtures which can also contain monomeric fatty acids. These crude polymerization products can be used directly, preferably, however, after the separation of the monomeric fatty acid fraction. Pure dimerized fatty acids are obtainable by distillation. The quality of the materials produced from it, such as color and storage stability, can be improved by hydrogenation or partial hydrogenation.

The ether diamines, which can be used for the aminoamides of the invention are prepared, for example, from linear di-primary alkane diols having 3 to 6 carbon atoms by cyanoethylation using basic catalysts and subsequent reduction with hydrogen in the presence of Raney nickel. The ether diamines can also be prepared by reacting the halides of the corresponding glycol ethers with ammonia, or by direct amination of the above glycols with ammonia in the presence of catalysts.

Preparation of the aminoamides of the invention takes place in the known manner by reacting the polymeric fatty acids or their amide-forming derivatives with ether diamines. For this purpose, one equivalent of acid is heated with more than one equivalent, preferably with two equivalents, of amine at temperatures of up to 300° C., preferably at 150–250° C., and the water (or alcohol, etc.) of reaction formed in the process is removed. Using conjugated fatty acids as the starting material for the polymeric fatty acids, it is also possible to carry out the polymerization and the amidation as one-step process.

The aminoamides of the invention mixed with other resins, especially epoxy resins, can find application as coating compositions, sealing compounds, troweling compounds, adhesives and laminates. The resulting products exhibit good elastic properties and good mechanical strength values, which are retained to a considerable extent even at low temperatures.

Aminoamides from ether diamines and polycarboxylic acids have been described in U.S. Pat. 3,257,342. The reaction of ether diamines described in this patent (these ether diamines have a general formula

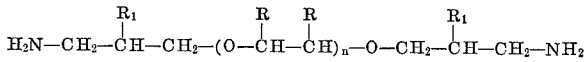

where $n$ is an integer from 1 to 40, $R_1$ is hydrogen or a methyl group, and R is hydrogen or an alkyl group, whereby two R resisdues on two adjacent carbon atoms must not contain more than 4 carbon atoms) with polycarboxylic acids leads to an aminoamide which, due to the polyglycol fraction, has lower mechanical properties, such as tensile strength and hardness, and is more sensitive to chemicals than the aminoamides of this invention. Tables 1 and 2 represent these differences numerically.

TABLE 1

Properties of thermosetting plastics produced by curing a bisphenol A (2,2-bis(p-hydroxyphenyl)propane) epoxy resin with aminoamides made from various ether diamines and dimerized fatty acids.

| Aminoamide curing agent based on ether diamine of— | Tensile strength, (kg./cm.²) | Elongation, percent | Shore hardness | Weight increase in percent after 4 weeks in | | |
|---|---|---|---|---|---|---|
| | | | | Water | HCl, 10% | NaOH, 10% |
| Diethylene glycol, control resin | 120 | 78 | A 86 | 3.5 | 17.6 | 2.4 |
| Butanediol | 185 | 75 | C 92 | 1.4 | 3.1 | 1.1 |

From this comparison, the superiority of the aminoamide curing agent based on the ether diamine of 1,4-butanediol over the aminoamide based on the ether diamine of diethylene glycol becomes quite apparent. It is particularly pronounced in the tensile strength values—at higher hardness than the control resin at the same time—and resistance to aqueous hydrochloric acid.

TABLE 2

Tensile strength and elongation of thermosetting plastics of Table 1 after 4 weeks of immersion in aqueous media.

| Aminoamide based on ether diamine of— | Resin before immersion, TS/e | Water, TS/e | Decrease of TS, percent | 10% HCl, TS/e | Decrease of TS, percent | 10% NaOH, TS/e | Decrease of TS, percent |
|---|---|---|---|---|---|---|---|
| Diethylene glycol, control resin | 120/78 | 70/70 | 42 | 50/55 | 58 | 60/65 | 50 |
| 1,4-butanediol | 185/75 | 150/65 | 19 | 120/50 | 35 | 150/60 | 19 |

TS=Tensile strength; e=Elongation.

The values of this table also show that the influence of water and aqueous chemicals on the resin properties is much greater in the case of resin based on diethylene glycol than in the case of the resin containing the curing agent of this invention.

Using aminoamides of the invention, preferably fluid epoxides glycidyl polyethers based on bisphenol A and novolacs (phenol formaldehyde, polynucleous polyhydroxy, resin) or mixtures of various fluid epoxy resins can be cured. Through a suitable choice of epoxides and aminoamides, products possessing flexible to soft-flexible properties can be obtained.

Mixtures of aminoamides produced from ether diamines of different structures can also be used for curing the epoxides. Further, the aminoamides of the invention can be used in a mixture with other amine curing agents. The aminoamides of the invention have a good compatibility not only with the liquid epoxy resins, but also with the solid epoxy resins. They can, therefore, be used as curing agents for the epoxy resin varnishes in solution, and upon drying produce clear, glossy films.

The aminoamides of the invention can also be combined with glycidyl ethers of polymeric fatty alcohols with a particular advantage. In addition to the already discussed flexibilizing property of the aminoamides, the above mentioned epoxy resins also contribute toward an adjustment of softness of the resins.

The mix ratio of curing agent to epoxy resin is variable within wide limits, however, a mix ratio of 1:1 (based on equivalents) is preferred.

Preparation of the aminoamides of the invention will be explained in the following examples. Under parts, parts by weight are to be understood. The mechanical data were measured in all cases two weeks after the preparation of the castings.

EXAMPLE I

In a reaction vessel equipped with dephlegmator or reflux condenser, agitator, thermometer and $N_2$ inlet tube, 900 parts of a commercial dimerized fatty acid (dimerized tall oil fatty acids) are mixed with 670 parts of an ether diamine (amine value=532) which has been obtained by cyanoethylation and hydrogenation of 1,4-butanediol. The condensation is carried out over a 7 hour heating period, whereby the heat input is regulated in such a way that the contents of the flask reach 120° during the first hour and then remain at 200° C. for about 6 more hours. The condensation product has an amine value of 123, an acid value of 1.2; the viscosity is 126 poises at 25° C.

EXAMPLE II 100 parts of a bisphenol A-based glycidyl ether (reaction product of epichlorhydrin and 2,2-bis(p-hydroxyphenyl) propane having terminal 1,2 epoxide groups) (epoxide value 0.52) are mixed with 120 parts of the aminoamide described in Example I (amine value=123), and cured for 1 hour at 100° C. A resin with a tensile strength of 185 Kp. (kiloponds)/cm.² and an elongation (at break) of 75% is obtained. The Shore C hardness is 92.

EXAMPLE III

In the apparatus described in Example I and under the conditions specified in the same example, 400 parts of a commercial dimerized fatty acid (dimerized tall oil fatty acids) are condensed with 334 parts of an ether diamine (amine value=475) produced by cyanoethylation and hydrogenation of 1,6-hexanediol. The resulting aminoamide has an amine value of 118. One hundred twenty-four parts of this curing agent are mixed with 100 parts of a bisphenol A-based glycidyl ether (epoxide value=0.52) and cured for 1 hour at 100° C. The resulting resin has a tensile strength of 161 Kp./cm.² and elongation (at break) of 123%. The Shore C hardness is 75.

EXAMPLE IV

In the apparatus described in Example I and under the conditions specified in the same example, 204 parts of an ether diamine (AmV=580) prepared by cyanoethylation and hydrogenation of 1,3-propanediol are condensed with 300 parts of a commercial dimerized fatty acid (dimerized tall oil fatty acids). The resulting aminoamide has an amine value of 126. One hundred sixteen parts of this curing agent are mixed with 100 parts of a bisphenol A-based glycidyl ether (epoxide value=0.52) and cured for 1 hour at 100° C. A resin with a tensile strength of 185 Kp./cm.² and elongation of 106% is obtained. The Shore C hardness is 75.

EXAMPLE V

Four hundred parts of a 50% solution of a bisphenol A-based epoxy resin (epoxide value=0.200) are mixed with 95 parts of the aminoamide described in Example I based on 1,4-butanediol, with addition of 300 parts of a xylol-Cellosolve mixture (4:1). The clear solution, after the evaporation of solvent, cures to clear, tough films on materials such as metal, glass, wood, etc.

The embodiments of the invention in which an exclusive property or privilege is claimed are defined as follows:

1. An aminoamide prepared by reacting at a temperature of 150–300° C. a polymeric fat acid and an ether diamine of the formula $$H_2N-R-O-(CH_2)_n-O-R-NH_2$$

where R is , or

radical and $n$ is an integer 3, 4, 5 or 6, wherein 2 amine equivalents of said diamine are employed per acid equivalent of said polymeric fat acid.

2. An aminoamide as defined in claim 1 wherein said polymeric fat acid is dimerized tall oil fatty acids.

3. A cured composition of matter comprising the reaction product of an epoxy resin having terminal 1,2-epoxide group and an aminoamide prepared by reacting at a temperature of 150–300° C. a polymeric fat acid and an ether diamine of the formula $$H_2N-R-O-(CH_2)_n-O-R-NH_2$$

where R is $-CH_2-CH_2-$, $-CH_2-CH_2-CH_2-$, or

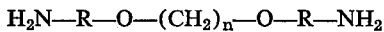

radical and n is an integer 3, 4, 5 or 6, wherein 2 amine equivalents of said diamine are employed per acid equivalent of said polymeric fat acid and wherein the equivalents ratio of said epoxy resin and aminoamide is substantially 1:1.

4. A cured composition of matter as defined in claim 3 wherein said polymeric fat acid is dimerized tall oil fatty acids.

5. A cured composition as defined in claim 3 wherein said epoxy resin is the glycidyl polyether of 2,2-bis(p-hydroxyphenyl) propane.

References Cited

UNITED STATES PATENTS

| 3,257,342 | 6/1966 | Kwong | 260—18 |
| 3,499,853 | 3/1970 | Griehsch et al. | 260—404.5X |

FOREIGN PATENTS

| 1,438,670 | 4/1966 | France | 260—18 |

HOSEA E. TAYLOR, Primary Examiner

C. W. IVY, Assistant Examiner

U.S. Cl. X.R.

260—404.5, 830